United States Patent
Froes et al.

(10) Patent No.: US 6,451,279 B1
(45) Date of Patent: Sep. 17, 2002

(54) PROCESS FOR MAKING CARBIDES THROUGH MECHANOCHEMICAL PROCESSING

(75) Inventors: Francis H. Froes; Baburaj G. Eranezhuth, both of Moscow, ID (US)

(73) Assignee: Idaho Research Foundation, Inc., Moscow, ID (US)

( * ) Notice: Subject to any disclaimer, the term of this patent is extended or adjusted under 35 U.S.C. 154(b) by 0 days.

(21) Appl. No.: 09/510,835

(22) Filed: Feb. 23, 2000

Related U.S. Application Data

(60) Provisional application No. 60/121,415, filed on Feb. 23, 1999.

(51) Int. Cl.$^7$ .............................................. C01B 31/30
(52) U.S. Cl. ...................................... 423/439; 423/440
(58) Field of Search .................................. 423/440, 439

(56) References Cited

U.S. PATENT DOCUMENTS 5,110,768 A * 5/1992 Kaner et al. ................. 423/440

* cited by examiner

*Primary Examiner*—Stuart L. Hendrickson
(74) *Attorney, Agent, or Firm*—Ormiston & McKinney, PLLC

(57) ABSTRACT

Forming metal and metalloid carbides by mechanically inducing a reduction reaction between a metal chloride (or a metalloid chloride) and a metal carbide. The reduction reactions are induced mechanically by milling the reactants. Alloy carbides may also be produced by mechanically inducing the co-reduction of metal chlorides or metalloid chlorides and a metal carbide according to the equation: $M_1 \text{chloride} + M_2 \text{chloride} + M_3 \text{carbide} \rightarrow M_1 M_2 \text{carbide}$, where $M_1$ is a metal or metalloid, $M_2$ is a metal or metalloid and $M_3$ is a suitable carbide reducing agent.

7 Claims, 2 Drawing Sheets

PROCESS FOR MAKING CARBIDES THROUGH MECHANOCHEMICAL PROCESSING

CROSS REFERENCE TO RELATED APPLICATIONS

This application claims subject matter disclosed in the abandoned provisional application Serial No. 60/121,415 filed Feb. 23, 1999, which is incorporated herein in its entirety.

FIELD OF THE INVENTION

The invention relates generally to powder metallurgy and, more particularly, to the application of mechanical alloying techniques to chemical refining through solid state reactions.

BACKGROUND

Most of the metals and metalloids of the periodic table form binary compounds of carbon called carbides. High temperature carbide ceramics, formed by consolidation of carbide powders, exhibit attractive characteristics including high strength, hardness, wear resistance, elevated temperature capacity and other properties that make them useful for a variety of applications. Applications for these ceramics are increasing due to their superior properties compared to alternate metallic and other non-metallic candidate materials. Some examples of application include cutting tools, mechanical seals, bullet proof vests, metal reinforcements, abrasive wear-resistant nozzles, bearings, grinding media for fine grinding of ceramic powders, tools and die components, heat exchangers, valves, igniters, pump components used in molten metal handling, furnace components in semiconductor manufacturing, electronic resistors, and laser mirrors. The physical and chemical properties of carbides are dependent on the nature of the metal/carbon bonds in these compounds. Depending on the nature of chemical bonds the carbides can be categorized into the following types:

(i) Ionic carbides: These are salt like carbides of metallic elements of groups IA, IIA and IIIB of the Periodic Table, the lanthanides and actinides included, e.g., $CaC_2$, $Na_2C_2$, $HgC_2$, $LaC_2$, $UC_2$, $ThC_2$.

(ii) Interstitial carbides: These are metal-like carbides of the transition elements of groups IV, V and VI of the Periodic Table. The metallic character of these carbides is shown in their metallic luster, and high thermal and electrical conductivity. e.g. TiC, $Nb_2C$, WC, MoC, TaC, $Fe_3C$, $Co_2C$.

(iii) Covalent carbides: These are diamond-like carbides having extreme hardness, which is exceeded only by diamond itself, e.g., $B_4C$, SiC. Ionic carbides are highly reactive compared to other carbides. The interstitial and covalent carbides have high hardness and elevated melting points and their consolidation into carbide ceramics necessitates high temperature diffusion between the particles. Diffusion is easier for particles with larger surface areas. For this reason carbides are consolidated after comminution of commercially available powders to reduced sizes.

Development of cost effective processes and materials will greatly expand current uses and will lead to many new applications for the carbide ceramics. Currently, limiting factors in the wide spread use of carbide ceramics are the high cost of synthesis of powders and their consolidation, and the poor toughness of the finished material. These problems can be minimized if carbides can be synthesized in ultrafine powder form because materials with grain size in the nanoscale range possess unique physical and mechanical properties. Toughness of the carbides has been improved in the past by alloying different carbides to form solid solutions. However, work on formation of carbide solid solutions has progressed very little in the past, especially for ultrafine powders.

Conventional methods of production of ultrafine carbides are based on the reduction of a metallic oxide or compound by carbon or a carbon-containing compound at high temperatures followed by comminution.

Use of alloy carbides in place of single carbides reduces brittleness. A major break through in the manufacture of carbide ceramics occurred with the development of WC—TiC and WC—TaC alloy carbides in the 1930s. Generally duplex structures in cemented carbides are harder and tougher than single, unalloyed carbides. For example, the ductility of vanadium carbide and titanium carbide can be improved by alloying with other carbides. A resurgence of interest in alloys of carbides took place in the 1970s with the development of a series of patents on WC-free alloys including TiC—$Mo_2C$—Ni and $(Ti,Mo,V,Nb)C_{1-x}$, and carbonitrides Ti(CN) and (Ti,Mo)(CN) for cutting tool applications.

The lack of availability of the ceramic carbide alloys relates to the problems associated with the synthesis of these powders. Conventionally, alloying of carbides has been pursued in different ways. The first, alloying of different carbide powders by solid state diffusion, second, carburization of metal oxide mixtures or metal powder mixtures with carbon black and the third, separation of solid solutions of carbides from metal melts. Despite the high temperature (1400–2600° C.) of the process, it is difficult to retain high mutual solubility of the carbides because of the steep decrease in solubility with decreasing temperature. In the case of the W—Ta—C system, it is almost impossible to synthesize single-phase (W,Ta)C because of the rapidly decreasing solid solubility of WC in TaC, as the temperature is reduced. For this reason (W, Ta)C alloy is called a "double phase" carbide. These problems with single-phase production increase as the number of carbide forming elements in the material increase.

With the exception of SiC, carbide ceramics have not developed commercially to levels similar to those of oxide ceramics because synthesis of carbides, even at the micron sized particle level, is difficult because of the high process temperatures necessary. The carbide industry got a boost in the early 1970s with the recognition that carbides are potential materials for use in engines operating at elevated temperature. However, growth of the carbide industry has been limited by the unavailability of carbides in fine powder form at an affordable cost. Crushing and grinding of carbides can be used to produce 1–10 micron sized powder; but carbides are then expensive. The typical cost of sub-micron size titanium carbide, for example, varies from $30 to $100 per kg, depending on quality. The cost of production increases in proportion to the reduction in particle size. The availability of alloy carbides is even worse because of the necessity for additional processing steps. Thus there is strong technical "pull" for production of cost-affordable single carbides and alloy carbides.

SUMMARY

The present invention is directed to the formation of metal and metalloid carbides by mechanically inducing a reduction reaction between a metal chloride (or a metalloid chloride) and a metal carbide. In the preferred embodiment of the invention, the reduction reactions are induced mechanically by milling the reactants. Group IA, IIA and IIIB carbides along with aluminum carbide and zinc carbide should provide suitable reducing agents. Alloy carbides may also be produced by mechanically inducing the co-reduction of metal chlorides or metalloid chlorides and a metal carbide according to the equation: $M_1$chloride+$M_2$chloride+ $M_3$carbide→$M_1M_2$carbide, where $M_1$ is a metal or metalloid, $M_2$ is a metal or metalloid and $M_3$ is a suitable metal carbide reducing agent.

DETAILED DESCRIPTION

Figure 1:
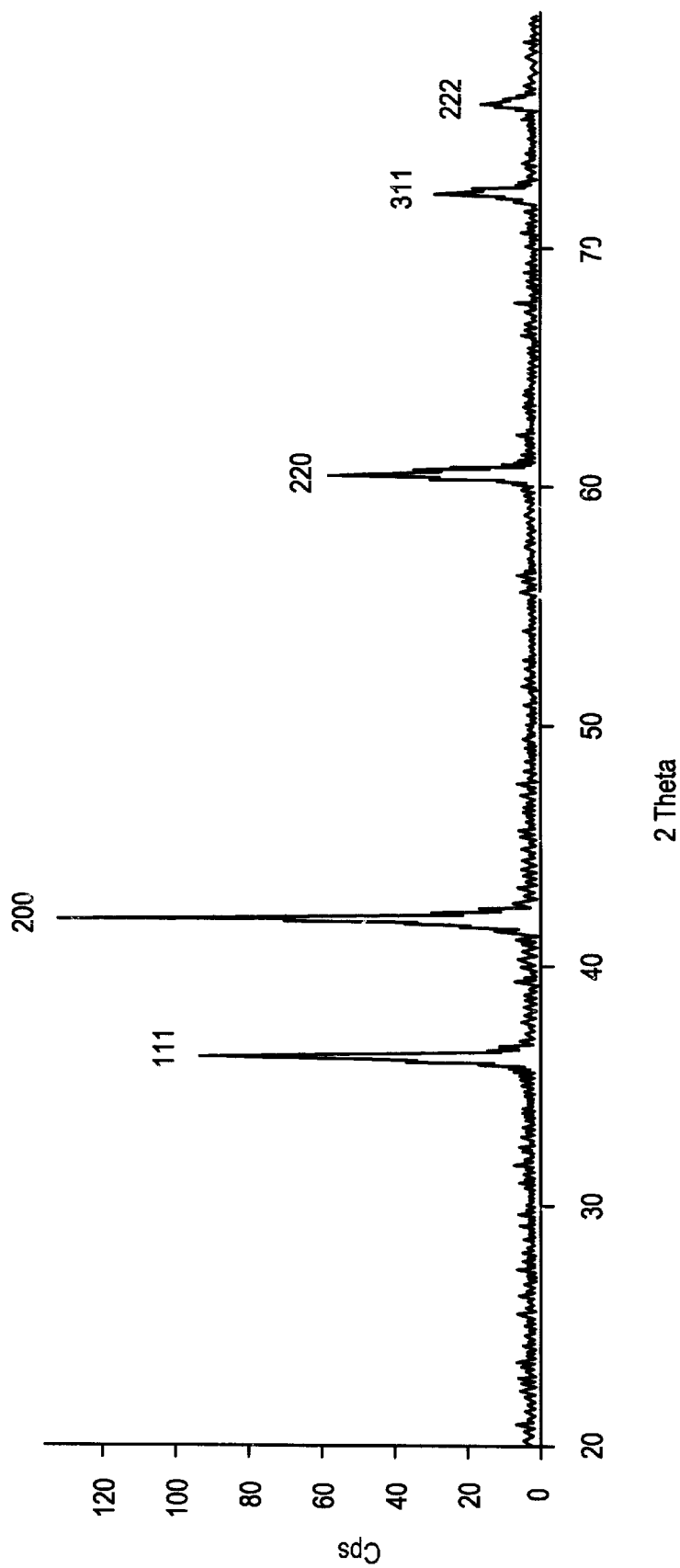
FIG. 1 is an X-ray diffraction pattern from TiC formed through the reaction shown in Equation (2).

Recent work at the University of Idaho has demonstrated the feasibility of synthesizing carbides of metals and metalloids at ambient temperatures by mechanochemical processing. The reaction

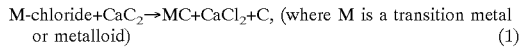

M-chloride+$CaC_2$→MC+$CaCl_2$+C, (where M is a transition metal or metalloid) (1)

is thermodynamically possible; but does not proceed in the forward direction, because of the unavailability of sufficient activation energy. Application of mechanical milling to the reactants can provide the necessary activation energy.

The mechanochemical process is broadly the use of mechanical energy to cause reactions, which normally require elevated temperatures, to occur at ambient temperatures. For example reduction reactions which are normally carried out at temperatures close to 1000° C. can be achieved at ambient temperatures through mechanochemical processing. Normally, the reaction products formed by mechanochemical processing are ultrafine powders. Ultrafine in the present context means a wide distribution of particle size ranging from few nanometers to one micron. Mechanochemical processing of metals and metal alloys is described in more detail in its U.S. Pat. No. 6,231,636 titled Mechanochemical Processing For Metals and Metal Alloys which is incorporated herein by reference in its entirety.

The general equation given above illustrates the basis for the synthesis of TiC. The typical equation for TiC is given below:

$TiCl_4$+2$CaC_2$→TiC+2$CaCl_2$+3C (2)

The reaction was induced and completed by mechanical milling the reactants inside a Spex 8000 milling vial. Measurements of the vial temperature showed the start of the exothermic reaction after 12 minutes of milling. The reaction product consists of one mole of TiC and 3 moles of free carbon in a $CaCl_2$ matrix. The structural identity of carbon obtained from this reaction is still not clear. Some of the XRD peaks from carbon matches graphite while others cannot be matched with any of the carbon crystal structures. The by-product $CaCl_2$ is leached out sequentially by dilute formic acid and de-oxygenated water, with the aid of ultrasonic vibrator to enhance the dissolution of salt and a centrifuge to settle the leached fine powder in the leaching liquid.

Stoichiometric amounts of $TiCl_4$ and $CaC_2$ were packed in a steel vial along with the milling balls, under an argon atmosphere, with a ball to reactants charge ratio of 10:1. In some cases the reaction was modified by the use of $CaC_2$/Mg mixture as the reducing agent. A thermocouple was attached to the vial for continuous monitoring of the temperature during milling. The vial was then closed tightly and vibrated vigorously using a standard Spex 8000 mixer mill and the temperature was recorded as a function of milling time. A temperature rise occurs due to both mechanical milling and chemical reactions. The as-milled powder was leached in de-ionized water under an argon atmosphere. Part of the salt formed during the reaction dissolves in the water. Any excess $CaC_2$ reacts with water forming $Ca(OH)_2$. For effective removal of $Ca(OH)_2$ the slurry was treated with 5 to 10% formic acid solution. To further activate the reaction and cause dissolution of Ca salts, the slurry was agitated ultrasonically. The TiC powder was recovered by centrifuging the slurry. The processes of dissolution, ultrasonic treatment and centrifuging were repeated a 3 to 5 times. The settled titanium carbide was finally washed with alcohol followed by drying in air. The powder thus obtained was characterized using X-ray diffraction and transmission electron microscopy. As an alternative to leaching, reaction by-products may be removed by sublimation with the aid of heating with or without vacuum.

Carbon particles dissociate easily from the surface of the carbide particles during leaching as they are loosely bonded because of the low processing temperature. In contrast, removal of carbon from agglomerates of carbide particles produced by conventional high temperature processes is difficult because of the strong bonding.

The reaction has also been modified to avoid the liberation of free carbon, by the addition of Mg.

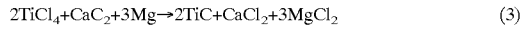

2$TiCl_4$+$CaC_2$+3Mg→2TiC+$CaCl_2$+3$MgCl_2$ (3)

Equation (3) shows that the Ti produced by reduction of $TiCl_4$ with Mg and the C generated by the reaction between $TiCl_4$ and $CaC_2$ combine to form TiC. Experiments involving stoichiometric amounts of reactants produced TiC.

This method can be used to control the carbon content in metal carbides. For example, use of $CaC_2$ and Mg in 1:3 ratio results in the formation of stoichiometric TiC. An increase in the Mg content will produce off-stoichiometric carbides, with carbon vacant sites in the crystal structure of TiC.

Figure 2:
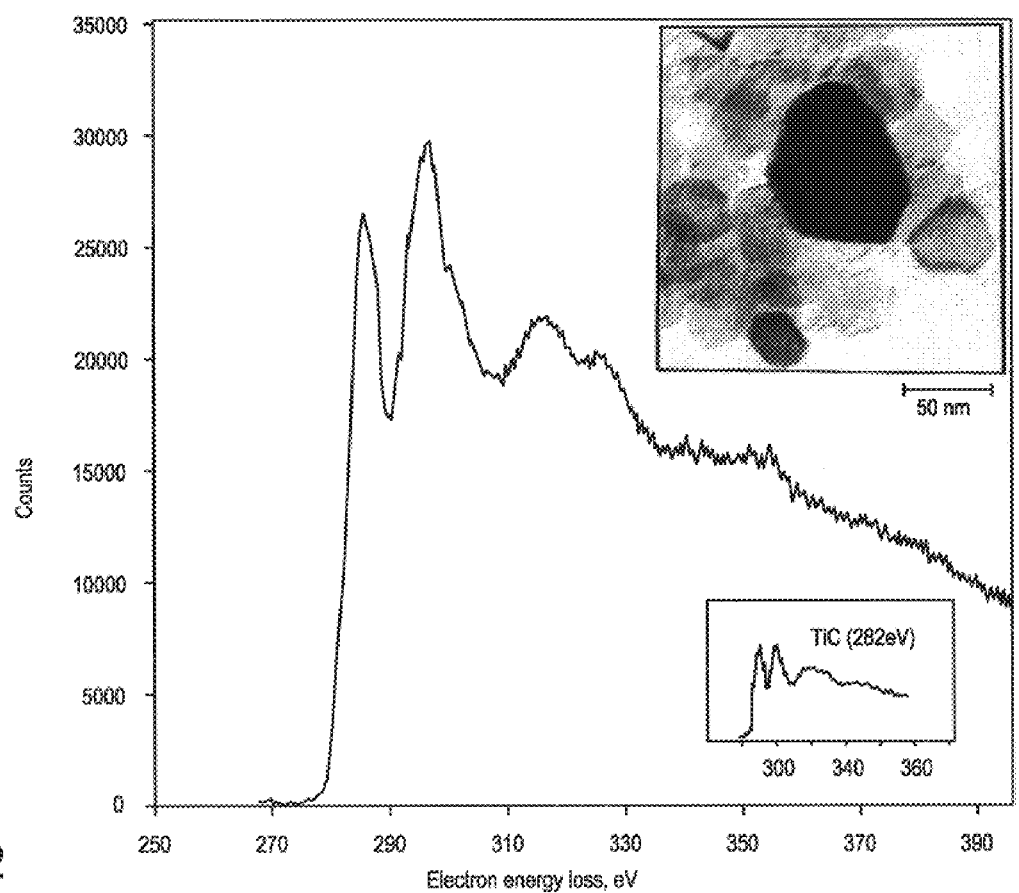
FIG. 2 shows the PEELS spectrum from a typical TiC crystal. The insets (a) at top right of the FIG. 2 is a TEM bright field micrograph of the fine TiC crystals separated by centrifuging the reaction products and (b) at the bottom right is a spectrum for a carbon K-edge in TiC taken from a standard.

FIG. 1 is an X-ray diffraction pattern from TiC formed through the reaction shown in Equation (2). This pattern does not show any detectable impurities in the material. The transmission electron microscopy (TEM) examination shows a wide distribution of TiC particles in the size range of 10–1000 nm. Energy dispersive spectroscopic analysis (EDS) and parallel electron energy loss spectrometry (PEELS) using TEM of the TiC crystals have been carried out to evaluate the purity of the product. FIG. 2 shows the PEELS spectrum from a typical TiC crystal. The insets (a) at top right of the FIG. 2 is a TEM bright field micrograph of the fine TiC crystals separated by centrifuging the reaction products and (b) at the bottom right is a spectrum for a carbon K-edge in TiC taken from a standard. The match in the K-edge positions of the inset and the experimental spectrum suggests the absence of impurity elements that might have altered the K-edges. The carbon K-edge for Ca in carbon compounds is around 346 eV. FIG. 2 clearly shows the absence of Ca.

Synthesis of Single Carbides

Single carbides TiC, ZrC and SiC have been synthesized from their respective chloride precursors by the method described above. Zr and Si chlorides are solids, unlike $TiCl_4$ which is a liquid, and the reaction kinetics for the formation of their carbides are expected to be different from that for TiC. Based on free energy changes during the reactions to form carbides, the reduction of $TiCl_4$ has a higher driving force for the forward reaction in comparison with the reduction of $ZrCl_4$. However the formation of a slurry of reactants constituted of the liquid $TiCl_4$ with $CaC_2$ and Mg impedes the motion of balls in the milling vial retarding the kinetics of reaction to form TiC. On the other hand, milling of $ZrCl_4$ involves only solid powder mixture and the efficiency of ball movement inside the mill is expected to be higher than that for a slurry. The competition between the thermodynamic and kinetic factors influencing the mechanochemical process is important in controlling the process.

Synthesis of Alloy Carbides

The basic principle in the synthesis of alloys by the mechanochemical process is the reduction of intimately mixed salts by a strong reducing agent. An example is the use of $CaH_2$ for the co-reduction of chlorides of titanium and aluminum to result in the formation of Ti-Al alloys. The reaction $$2TiCl_4 + 2AlCl_3 + 7CaH_2 \rightarrow 2TiAl(H) + 7CaCl_2 \tag{4}$$

gives rise to hydrogenated TiAl intermetallic compound in ultrafine form. The same technique will be employed to form ultrafine alloys of carbides by co-reduction of precursor salt mixtures using reducing carbide of elements from group IIA or IIIA in the periodic table.

Synthesis of Ti—Zr—C

Mixing of chlorides of Ti and Zr in mechanochemical processing will result in the formation of alloy carbide of $(Ti_{0.5}, Zr_{0.5})C$ as indicated in Equation (5)

$$TiCl_4 + ZrCl_4 + CaC_2 + 3Mg \rightarrow 2(Ti_{0.5}, Zr_{0.5})C + CaCl_2 + 3MgCl_2 \tag{5}$$

The mixed carbide will have the advantage of being in ultrafine size range due to the vary nature of processing. Since the carbides of Ti and Zr are structurally similar and the ionic size of Ti and Zr in the carbide structures falls within 10%, they might form substitutional solid solutions.

Synthesis of Other Ternary Carbides

The carbides of Ti, Zr, Ta and W possess similar crystal structures. Therefore it is expected that these carbides will form solid solutions by the present process.

Leaching

The time required for complete dissolution of salts is dependent on concentration of leaching solutions and intensity and duration of ultrasonic vibrations.

The reactions occurring during mechanochemical processing are dependent on the milling parameters including the ball size, ball to powder ratio and particle size of reactants. An increase in the ball to powder ratio and a decrease in particle size of reactants enhance the reactivity due to the increased probability of collisions and increased area of contact between the reactants. Recent work on reduction of titanium oxide by calcium hydride to synthesize titanium hydride has proven the effectiveness of increased ball to powder ratio in increasing the reaction rate. Similarly, a previous study on the effect of pre-milling to increase surface area and surface activity has demonstrated the influence of these factors in enhancing reactivity during mechanochemical processing induced reaction between $TiCl_4$ and Mg.

Different groups of carbides may be used as a reducing agent. For example, it is expected that Group IA, IIA and IIIB carbides will be suitable reducing agents. The reaction may be characterized generally by the Equation (6) for single carbides and Equation (7) for alloy carbides, where M is a metal or metalloid.

$$M_1 \text{chloride} + \text{GroupIA/IIA/IIIB carbide} \rightarrow M_1 \text{carbide} \tag{6}$$

$$M_1 \text{chloride} + M_2 \text{chloride} + \text{GroupIA/IIA/IIIB carbide} \rightarrow M_1 M_2 \text{carbide} \tag{7}$$

By-products may be removed by leaching or sublimation. In case the reaction is not complete by milling, the reaction may be enhanced by heat treatment. Heat treatment may be used simultaneously for the completion of the reaction and for removal of by-product salts by sublimation. Control of particle size of the carbides may be achieved by changing the milling parameters including ball to powder ratio, ball size, mixtures of ball sizes, pre-milling of reactants and heat treatments after milling, when the reaction is incomplete.

The invention has been shown and described with reference to the production of nanocrystalline titanium carbide and titanium alloy carbide powder. It will be understood, however, that the invention may be used in these and other embodiments to produce crystalline or amorphous carbides of these and other metals, metalloids and alloys. It is expected that the invented process may be used effectively to produce carbides for most or all of the metals and metalloids of the Periodic table. Also, as noted above, it is expected aluminum carbide and zinc carbide may also make suitable reducing agents. Therefore, it is to be understood that the embodiments of the invention shown and described may be modified or varied without departing from the scope of the invention, which is set forth in the following claims.

What is claimed is:

1. A process for making a carbide, comprising:

mechanically inducing the reaction $M^1$ chloride+ $M_2$carbide→$M_1$carbide+$M_2$chloride, where $M_1$ is a metal or metalloid and $M_2$ is lithium, sodium, potassium, rubidium, cesium, francium, beryllium, aluminum, zinc, magnesium, calcium, strontium, barium, radium, scandium, yttrium, lanthanum or actinium; and removing $M_2$chloride from the reaction products by sublimation.

2. A process for making a metal carbide, comprising mechanically inducing a reduction reaction between a metal chloride, calcium carbide and magnesium.

3. The process according to claim 2, wherein mechanically inducing the reaction comprises milling the metal chloride, the calcium carbide and the magnesium.

4. A process for making titanium carbide, comprising milling titanium chloride, calcium carbide and magnesium.

5. A process for making titanium carbide, comprising mechanically inducing the reaction $2TiCl_4 + CaC_2 + 3Mg \rightarrow 2TiC + CaCl_2 + 3\ MgCl_2$.

6. The process according to claim 5, wherein mechanically inducing the reaction comprises milling titanium chloride, calcium carbide and magnesium.

7. A process for making titanium carbide, comprising:

mechanically inducing the reaction $TiCl_4 + 2CaC_2 \rightarrow TiC + 2CaCl_2 + 3C$; and removing calcium chloride from the reaction products by sublimation.

* * * * *